March 10, 1942.    H. L. NEWELL    2,275,917
CONTROL DEVICE
Filed April 25, 1940
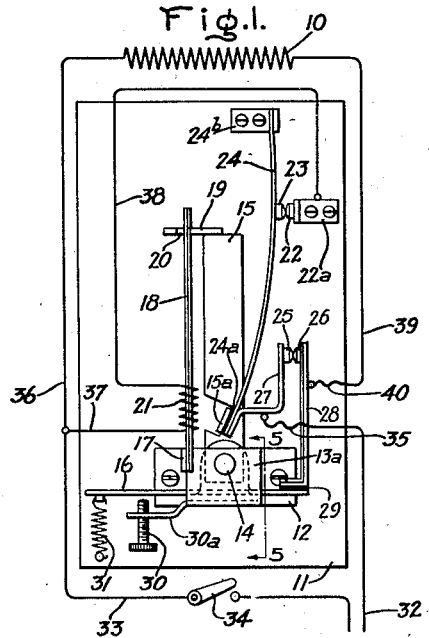
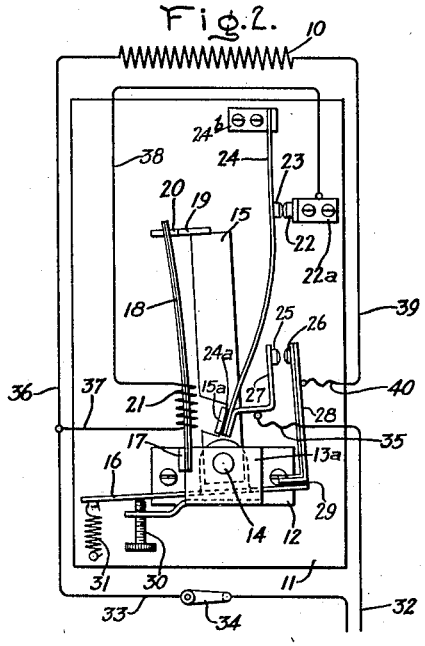
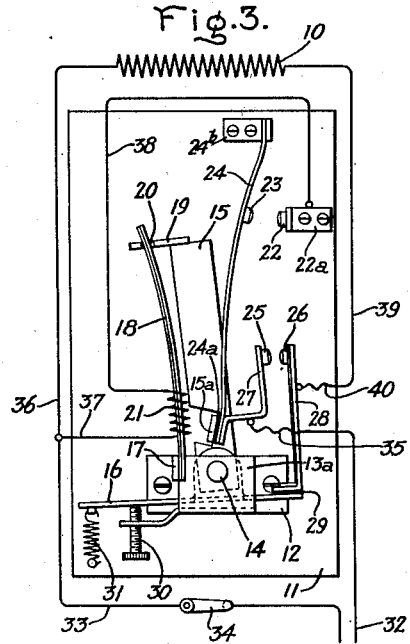
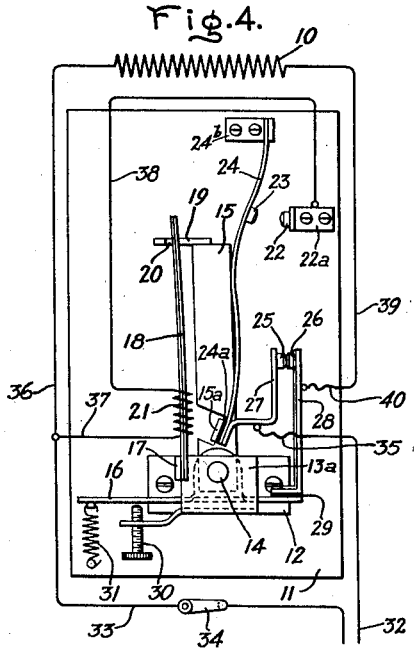
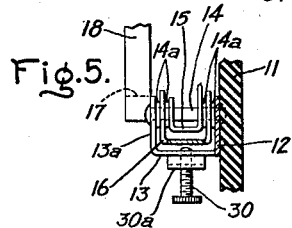
Inventor:
Heber L. Newell,
by Harry E. Dunham
His Attorney.

Patented Mar. 10, 1942

2,275,917

UNITED STATES PATENT OFFICE 2,275,917

CONTROL DEVICE

Heber L. Newell, Stratford, Conn., assignor to General Electric Company, a corporation of New York Application April 25, 1940, Serial No. 331,583

14 Claims. (Cl. 200—122)

This invention relates to a control device and more particularly to a thermostatically operated control device by which the electrical power to a heating appliance may be regulated to any value varying from fully off to fully on.

While not limited thereto, control devices made in accordance with this invention are particularly applicable for controlling the wattage input to heating elements of the surface type such as are used in electric ranges or hot plates. In controlling this type of heating element, it has been common practice to provide a switch having a plurality of different positions by which different circuit arrangements are effected for the particular heating element so that different wattage outputs may be obtained. While such arrangements are suitable, they are subject to an inherent difficulty in that the exact wattage output for a particular cooking operation with a particular cooking vessel cannot be produced. In other words, the wattage output is varied by relatively large increments and no account can be taken of the variation in heat losses from different vessels or from the same vessel under changed ambient conditions. Nor can any account be taken of the small variations in heat required for different cooking operations.

It is the primary object of this invention to provide new and improved means for overcoming the inherent difficulties in control devices of the type referred to above and for obtaining flexible control of the electrical power input to the heating element of an electric appliance so that the output thereof may be substantially infinitely varied from zero to a predetermined maximum.

It is a further object of this invention to provide new and improved means for variably controlling the percentage of time the heating element of an appliance is energized so that the wattage output of the element may be regulated.

It is a further object of this invention to provide a new and improved control device for intermittently energizing an electrical circuit so that the percentage of time the circuit is energized remains substantially as preselected irrespective of the normal changes in ambient conditions.

It is a further object of this invention to provide a new and improved control device for intermittently energizing the heating element of an electrical appliance to produce variable wattage outputs therefor, the control device having means for automatically altering the preselected wattage output of the heating element in accordance with changed load requirements brought about by the normal changes in ambient conditions.

It is a specific object of this invention to provide new and improved means for regulating the percentage of time the heating element of an electric appliance is intermittently energized comprising a periodic switch having a substantially constant time cycle of operation and an adjustable member for controlling the points in the time cycle at which the heating element is energized and deenergized.

It is a further specific object of this invention to provide the heating element of an electric appliance with new and improved means for controlling the energization thereof for predetermined different time intervals comprising switch means for controlling the heating element, a thermally actuated periodic switch, and means for adjusting the first mentioned switch means so that it is actuated at different points in the time cycle of operation of said periodic switch.

It is a further specific object of this invention to provide an arrangement by which the percentage time which a heating element is energized during a cooking operation may be varied, the arrangement comprising a thermally actuated periodic switch having a time cycle of operation which is proportional to the heating and cooling of a thermal element and means for varying the points in said time cycle at which said heating element is energized and deenergized.

It is a further specific object of this invention to provide a new and improved control device of the aforementioned character which is simple in construction, reliable and efficient in operation, and may be manufactured at low cost.

Further objects and advantages of this invention will become apparent as the following description of the preferred form of this invention proceeds and the features of novelty which characterize this invention will be set forth in the claims appended to and forming a part of this specification.

For a more complete understanding of my invention, reference should be had to the accompanying drawing in which Fig. 1 is a diagrammatic view of the improved circuit and control arrangement of this invention showing the control in one of its circuit controlling positions; Fig. 2 is a view similar to Fig. 1 showing the control in another circuit controlling position; Fig. 3 is a view similar to Fig. 1 showing the control in another circuit controlling position; Fig. 4 is a view similar to Fig. 1 showing the contacts in still another controlling position; and Fig. 5 is a section taken on the line 5—5 of Fig. 1 showing details of the pivotal mounting for the control device.

Referring to the drawing, 10 represents the heating unit of any desired electrical appliance, such as a hot plate, electric blanket, electric range, etc., in which it is desired to regulate the wattage output in accordance with this invention. For the purposes of describing this invention, it will be assumed that the heating unit 10 represents the heating element of one of the surface units of an electric range.

In order to control the wattage input to the heating unit and thereby to control the wattage output of the unit so that the output may be infinitely varied from zero to a predetermined maximum amount, there is provided a control device by which the length of time the heating element 10 is energized during the heating and cooling cycle of operation of a thermal element may be varied from 100 per cent off to 100 per cent on. Referring to Figs. 1 and 5, it will be observed that the control device comprises a base 11 made of some suitable electrically insulating material upon which is mounted a frame 12. Included in the supporting frame 12 is a substantially L-shaped bracket 13 having a portion 13a which extends above the base 11 substantially parallel thereto. Provided in the bottom of the frame 12 and in the portion 13a of the bracket 13 are aligned openings in which is mounted a pin 14. Pivotally supported on the pin 14 are a bracket 15 and an arm 16, the bracket and arm being maintained in spaced relation with respect to each other and with respect to the frame by means of suitable spacing washers 14a. Integrally formed at one edge of the portion 13a of the L-shaped bracket 13 is a flange 17 to which is secured one end of a bimetallic temperature responsive element 18 which is mounted so that upon an increase in temperature it will deflect to the left as viewed in Fig. 1. Provided at the end of the pivotally mounted bracket 15 is a flange 19 which is provided with a recess or slot 20 through which the free end of the bimetallic element 18 is adapted to extend. The slot 20 is made somewhat wider than the thickness of the bimetallic element 18 so as to permit the bimetallic element to move freely therein.

Constructed and arranged so as to heat the bimetallic element 18 when energized is a heating element 21. While the heating element is shown wrapped on the bimetallic element, it will be understood that the element could, if desired, be mounted on a separate support and arranged in close proximity to the bimetallic element so as to perform the functions described more fully hereinafter. Provided for controlling the energization of the heating element 21 is a pair of contacts 22 and 23. The contact 22 is suitably secured to a bracket 22a mounted on the insulating base 11. The contact 23, on the other hand, is mounted intermediate the ends of a column spring 24, one end of which is fixed to a suitable fixed support 24b which is secured to the base 11 and the other end of which is secured to a struck up ear 15a provided in the bracket 15 adjacent the pivot point thereof, a layer of insulating material 24a being provided between the end of the column spring and the ear. For satisfactory operation of the column spring, the relatively movable end thereof should be supported as close as practicable to the pivot point of the bracket 15 and each support for the respective ends of the column spring should be positioned so that the supporting surface lies substantially tangent to the curvature of the spring at the point of support.

The column spring 24 is designed so that a predetermined movement of the relatively movable end thereof in accordance with movement of the bracket 15 will cause the spring to move from a position of stable equilibrium in which the contacts 22 and 23 are closed (Figs. 1 and 2) quickly and with a snap action to a position of stable equilibrium in which the contacts 22 and 23 are open (Figs. 3 and 4). In this way the contacts 22 and 23, when closed, are held closed until a predetermined movement of the end of the column spring is effected by the pivoting of the bracket 15 counterclockwise in response to movement of the bimetallic element 18 to the left and, when opened, they are held open until a predetermined movement of the end of the column spring 24 is effected by the pivoting of the bracket 15 clockwise in response to movement to the right. Thus, the contacts 22 and 23 will remain closed until the bimetallic element 18 has been heated a sufficient amount by the heater 21 to cause the column spring to be moved with a snap action to open the contacts and the contacts will remain open until the bimetallic member 18 has cooled sufficiently to cause the column spring to be moved with a snap action to close the contacts. It is, therefore, apparent that the contacts 22 and 23, the spring 24, the bimetallic element 18, the heater 21 and the bracket 15 cooperate to produce a self-actuating periodic switch having a time cycle of operation which is proportional to the heating and cooling of the bimetallic element 18. The length of this time cycle of operation depends upon the relative design of the component parts of the periodic switch and in the preferred form of this invention the parts are designed so that the thermally actuated periodic switch has a time cycle of operation of approximately one minute.

Arranged to control the energization of the main heating element 10 is a pair of contact elements 25 and 26. The contact element 25 is supported at the end of a contact bracket 27 which is secured to the bracket 15 preferably at the same place as the end of column spring 24 so that a common means may be used for securing both the column spring and bracket 27 adjacent the pivot point 14 of the bracket 15. The contact 26, on the other hand, is mounted on a contact bracket 28 which is mounted on one end of the arm 16, a layer of insulating material 29 being provided to insulate this bracket from the arm. With the contact bracket 27 supported on the bracket 15, oscillatory movement of this bracket in response to heating and cooling of the thermal element 18 will cause the contact 25 to be moved into and out of engagement with the contact 26.

In order to adjust the point in the time cycle at which the contact 25 is moved into and out of engagement with the contact 26 and thereby to control the length of time these contacts are in engagement during the time cycle of operation of the periodic switch, there is provided an adjustable stop comprising an adjusting screw 30 which is threadedly supported on a bracket 30a provided on the frame 12 and against the end of which the arm 16 is adapted to bear, a light spring 31 being provided to bias the arm 16 toward the stop. By rotating the adjusting screw clockwise so that the end thereof is moved upwardly as shown in the drawing, the arm 16 is pivoted clockwise about the pivot point 14 so as to cause the contact 26 to move to the right. In the limit of the clockwise rotation of the screw 30, the arm 16 will have been pivoted clockwise an amount sufficient to cause the contact 26 to be moved completely away from the contact 25 to provide a setting in which the heating element 10 will be permanently off irrespective of the operation of the periodic switch. Rotating the adjusting screw 30 counterclockwise from this extreme or off position will cause counterclockwise rotation of the arm 16 under the influence of spring 31 and this rotation of the arm 16 will continue until the contact 26 engages the contact 25. Since the spring 31 is relatively weak, engagement of the contact 26 with the contact 25 acts as a stop to limit the counterclockwise rotation of the arm, and, upon further counterclockwise movement of the adjusting screw, the end of the screw is moved out of engagement with the arm. The amount which the end of the adjusting screw is moved away from the arm 16 determines the amount which the arm 16 can move in a counterclockwise direction before its movement is limited by the adjusting screw and hence determines the length of time that the contacts 26 and 25 are in engagement during movement to the left of the contact 25. In the limit of its counterclockwise rotation, the adjusting screw or stop 30 can be moved sufficiently far from the arm 16 so that it is not engaged by the arm even though the contact 25 is moved to its extreme left-hand position. In this position of the stop, the contacts 25 and 26 will be in engagement throughout the entire time cycle of operation of the periodic switch and the heating unit controlled thereby will be energized continuously. For any setting of the adjustable stop between the two limiting positions described above, the heating unit will be intermittently energized through a portion of the time cycle of operation of the periodic switch and by this intermittent energization of the heating unit the wattage output thereof may be regulated in a substantially infinite number of steps between zero and a predetermined maximum.

The supply leads for the heating unit 10 and the heater element 21 are represented by the lines 32 and 33 which, it will be understood, are connected through a suitable manually operated switch 34 to any suitable source of supply. The lead 32 is connected through a suitable flexible connection 35 to the bracket 27. The lead 33, on the other hand, is connected to one end of the heater element 10 by means of lead 36 and to one end of the heater element 21 by means of lead 37. The opposite end of the heater element 21 is connected by means of a lead 38 to the fixed contact 22 of the periodic switch and the opposite end of the heater unit 10 is connected by means of the lead 39 which includes a flexible connection 40 to the bracket 28 and hence the contact 26 of the main circuit controlling contacts.

In considering the operation of the control device and circuit described above, it will be assumed that the adjustable stop 30 has been positioned so that the heating unit 10 will be energized during substantially half of the time cycle of operation of the periodic switch and it will be assumed that after this adjustment is made the manual switch 34 is closed to connect the control device and heating element 10 to a suitable source of supply. Referring now to Fig. 1, the control device is shown in the cold position after the aforementioned adjustment has been made. It will be observed that the adjusting screw 30 is back away from the arm 16 a predetermined amount and that both the periodic switch contact elements 22 and 23 and the main contact elements 25 and 26 are in engagement. Under these circumstances the heater element 10 is energized through the following circuit: from the line lead 33, through lead 36, heating unit 10, lead 39, flexible connection 40, contact bracket 28, contact 26, contact 25, contact bracket 27, flexible lead 35, back to the line 32. The heating unit 21, on the other hand, will be energized through the following circuit: from line 33 through lead 37, heating element 21, lead 38, contact support 22a, fixed contact 22, contact 23, column spring 24, contact bracket 27, flexible lead 35, back to the line 32. With the heating element 21 thus energized, the bimetallic element 18 will be heated and will deflect to the left, the free end thereof moving in the slot 20 to engage the flange 19 so as to cause the bracket 15 to be rotated counterclockwise about its pivot point 14. This movement of the bracket 15 causes the contact arm 27 and the contact 25 mounted thereon to be moved to the left. Under the influence of the spring 31, the bracket 28 and the contact element 26 mounted thereon also moves to the left a corresponding amount so that the contacts 25 and 26 remain in engagement. After a predetermined time, movement to the left of the contact bracket 28 is limited by the engagement of the arm 16 with the end of the adjusting screw 30 and, as shown in Fig. 2, further deflection to the left of the bimetallic element 18 causes the contact 25 to be moved away from the contact 26 thereby to open the heater circuit 10. The contacts 22 and 23, however, are still in engagement and hence the heater element 21 continues to be energized to cause further deflection to the left of the bimetallic element 18. After a predetermined additional deflection of the bimetallic element, depending upon the design and adjustment of the column spring 24, the end of the column spring secured to the bracket 15 will be deflected an amount sufficient to cause the spring to snap from the position shown in Fig. 2 to the position shown in Fig. 3 in which position the contact elements 22 and 23 are opened to deenergize the heater element. The position of the elements shown in Fig. 3 corresponds to the hot position for the control device.

With the heater element 21 deenergized, the bimetallic element starts to cool and in cooling deflects to the right. After a predetermined amount of cooling of the element, the bracket 15 will have been moved to the right an amount sufficient to cause the contact 25 to engage the contact 26 as shown in Fig. 4, and thereby to energize the heating unit 10. However, the contacts 22 and 23 for energizing the heater element 21 still remain open and the bimetallic element will still continue to cool and deflect to the right so that the arm 16 is pivoted clockwise and moved out of engagement with the adjustable stop 30. After a predetermined additional deflection to the right of the bimetallic element 18 and the bracket 15, again depending upon the design and adjustment of the column spring 24, the end of the column spring will have moved an amount sufficient to cause the spring to be snapped from the position shown in Fig. 4 to the position shown in Fig. 1 in which position the contacts 22 and 23 are engaged and the heating cycle is again initiated.

From this description of the operation of the control device forming the subject matter of this invention, it will be observed that the main contacts for the heating element 10 are periodically opened and closed at an adjustable point in the time cycle of operation of the periodic switch, the adjustment being controlled by the position of the adjustable stop 30 with reference to the arm 16. It is also to be observed that the time cycle of operation of the periodic switch depends upon the heating and cooling of the bimetallic element 18 and that the main contacts 25 and 26 are in engagement during a portion of the heating part of the time cycle of operation and during a portion of the cooling part of the time cycle of operation.

Since the period during which the main controlling contacts 25 and 26 are in engagement is proportional to both the heating and the cooling of the thermal element, the control device is substantially self-compensated for ambient temperature conditions. For example, if the ambient temperature should increase, the time for the heating portion of the cycle would be decreased but the time for the cooling portion of the cycle would be increased. Since the main controlling contacts are in engagement during a portion of each cycle, the effect of the ambient temperature change will be balanced out so that the time of operation of the contacts is substantially unaffected. Thus, the percentage of operation of the periodic switch remains substantially constant irrespective of ambient temperature changes.

While ambient changes will have substantially no effect on the preselected percentage of operating time of the heating unit as described above, such ambient temperature changes may affect the quantity of heat necessary for carrying out a particular cooking operation. In other words, changes in ambient temperature may make it desirable to supply a greater or less amount of heat as the case may be, in order to perform a certain cooking operation effectively. If it is desired to increase or decrease the wattage output automatically in accordance with ambient temperature changes in order to compensate for the different wattages required for a particular cooking operation under the changed ambient condition, the contact bracket 28 upon which the contact 26 is mounted may be made thermally responsive so that upon an increase in ambient temperature it would move to the right to reduce automatically the per cent of time that the contacts 25 and 26 are in engagement and upon a decrease in ambient temperature it would move to the left to increase automatically the per cent of time that the contacts are in engagement thereby increasing or reducing the per cent of time that the unit is energized in accordance with ambient temperatures.

In the preferred form of this invention the contact bracket 28 would be formed of bimetal in order to provide this automatic change in wattake output in accordance with ambient temperature changes.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. An adjustable circuit controller for controlling an electrical circuit in small increments between certain limits comprising control means for controlling said circuit, a thermal element, means independent of said circuit for causing said thermal element to be intermittently heated to define a time cycle of operation which is proportional to the heating and cooling of said thermal element, means for actuating said control means in accordance with movement of said thermal element, and means for adjusting the point in both said heating and cooling phases of said time cycle of operation at which said thermal element actuates said control means so that the percentage of time said control means are positioned to cause the energization of said electrical circuit may be varied.

2. An adjustable circuit controller for controlling an electrical circuit in small increments between certain limits comprising control means for controlling said circuit, thermally operated periodic switch means having a time cycle of operation which is independent of the energization of said circuit, means for connecting said control means and said periodic switch means so that said control means are actuated in accordance with movement of said periodic switch means, and means for adjusting said control means so that the percent of said time cycle of operation that said control means are in the circuit closing position may be regulated.

3. An adjustable circuit controller for controlling an electrical circuit in small increments between certain limits comprising control means for controlling said circuit, thermally operated periodic switch means having a time cycle of operation which is independent of the energization of said circuit and which has a time cycle of operation proportional to the heating and cooling of a thermal element, means for actuating said control means in accordance with movement of said periodic switch means so that said control means are in the circuit closing position during a portion of both said heating and cooling phases of said time cycle of operation, and means for adjusting said control means so that the percentage of said time cycle of operation during which said control means are in the circuit closing position may be varied.

4. An adjustable circuit controller for controlling an electrical circuit in small increments between certain limits comprising control means for controlling said circuit, periodic switch means having a time cycle of operation which is independent of the energization of said circuit and which is proportional to the heating and cooling of a thermal element, means for connecting said control means and said periodic switch means so that said control means are in the circuit closing position during a portion of both the heating and cooling phases of said time cycle of operation, and means for adjusting said control means so that the point in said heating phase and the point in said cooling phase at which said control means are moved to a different circuit controlling position may be regulated, the limits of adjustment of said adjusting means being a point at which said control means are in the off position for 100 per cent of said time cycle of operation and a point at which said control means are on for 100 per cent of said time cycle of operation.

5. An adjustable circuit controller for intermittently controlling the wattage input to a heating circuit so that the wattage output of the circuit may be substantially infinitely varied between zero and a predetermined maximum comprising control means for controlling said heating circuit, a bimetallic element, means for intermittently heating and cooling said bimetallic element so that said element has a cycle of operation which is substantially independent of the wattage output of the heating circuit, means connecting said control means to said bimetallic element so that said control means are moved to different circuit controlling positions in accordance with movement of said element, and means for adjusting said control means so that the points in said cycle of operation of said bimetallic element at which said control means are moved to different circuit controlling positions may be regulated to control the percentage of time said control means are in the circuit closing position.

6. An adjustable circuit controller for controlling the wattage output of a heating circuit in small increments between zero and a predetermined maximum comprising a pair of contacts for controlling said heating circuit, a bimetallic element, means for heating said bimetallic element, means independent of said heating circuit for intermittently controlling said heating means so that said bimetallic element is alternately heated and cooled to define a time cycle of operation proportional to the heating up and cooling down of said bimetallic element, means connecting one of said pair of contacts to said bimetallic element so that it is moved thereby, and means for adjusting said other of said pair of contacts so that the length of time said contacts are in engagement to energize said heating circuit during said heating and cooling phases of said time cycle of operation may be varied.

7. An adjustable circuit controller for intermittently controlling the wattage input to a heating circuit so that the wattage output of the circuit may be substantially infinitely varied between zero and a predetermined maximum comprising control means for controlling said heating circuit, periodic switch means having a time cycle of operation proportional to the heating and cooling of a thermal element in accordance with the energization and deenergization of an auxiliary heater, means connecting said control means and said thermal element so that said control means are moved to different circuit controlling positions in accordance with movement of said thermal element, and means for adjusting said control means to control the points in said heating and cooling phases of said time cycle of operation at which said control means are moved to different circuit controlling positions so that the percentage of time said control means are in the closed circuit position during both said heating and cooling phases of said time cycle of operation may be regulated between zero per cent and 100 per cent and the wattage output of said heating circuit thereby regulated between zero and a predetermined maximum.

8. An adjustable circuit controller for intermittently controlling the wattage input to a heating circuit so that the wattage output of the circuit may be substantially infinitely varied between zero and a predetermined maximum comprising control means for controlling said heating circuit, a bimetallic element, a heater for said bimetallic element, auxiliary control means for said heater, means for intermittently operating said auxiliary control means so that said heater is intermittently energized and deenergized to produce a cycle of operation of said bimetallic element which is proportional to the heating and cooling thereof, means for connecting said first mentioned control means to said bimetallic element so that said control means are moved to different circuit controlling positions in accordance with the heating and cooling of said element, and means for controlling the point in both the heating and cooling movement of said bimetallic element at which said control means are moved from the circuit closing position to the circuit opening position and from the circuit opening position to the circuit closing position so that the percentage of time said control means are in the circuit closing position during said time cycle of operation may be varied.

9. An adjustable circuit controller for controlling the wattage output of a heating circuit in small increments between zero and a predetermined maximum output comprising a pair of contacts for controlling said heating circuit, a bimetallic element, means independent of said heating circuit for intermittently heating said bimetallic element to produce a time cycle of operation thereof which is proportional to the heating and cooling of said bimetallic element, means for causing one of said contacts of said pair of contacts to oscillate in accordance with movement of said bimetallic element, and adjustable means associated with said other contact of said pair of contacts for controlling the length of time said contacts are in engagement during the oscillatory movement of said first mentioned contact so that the wattage output of said heating circuit is varied, and means responsive to ambient temperature associated with one of said contact members for adjusting said length of time and hence the wattage output of said heating circuit to compensate said wattage output for the changed requirements under different ambient conditions.

10. An adjustable circuit controller for intermittently controlling the wattage input to a heating circuit so that the wattage output of the circuit may be substantially infinitely varied between zero and a predetermined maximum comprising control means for controlling said heating circuit, periodic switch means having a time cycle of operation proportional to the heating and cooling of a thermal element so that said time cycle of operation is substantially independent of changes in ambient conditions, means for actuating said control means in accordance with movement of said thermal element so that said control means are open during the heating of said element and closed during the cooling thereof, means for adjusting said control means so that the point in the heating and cooling of said thermal element at which said control means are moved to a different circuit controlling position may be regulated to control the percentage of time between zero and 100 per cent that said control means are in the circuit closing position during the time cycle of operation of said periodic switch whereby the wattage output of said heating circuit may be substantially infinitely varied between zero and a predetermined maximum, and means for automatically adjusting the position of said control means in response to changes in ambient temperature conditions so that the wattage output of said said heating circuit may be automatically varied to compensate for the changed heating requirements under the altered ambient condition.

11. An adjustable circuit controller for controlling the wattage output of the heating circuit in small increments between zero and a maximum output comprising a support, a bimetallic element having one end fixed to said support and its opposite end free to move, a bracket pivotally mounted on said support and operatively associated with the free end of said bimetallic element so as to be moved about its pivot point in accordance with deflection of said free end, contact means for controlling said heating circuit, means for supporting a portion of said contact means on said bracket so as to be moved thereby, a second bracket pivotally mounted on said support, means for supporting the remainder of said contact means on said second braket, an auxiliary heater element adjacent said bimetallic element for heating the same, a pair of contacts for controlling said auxiliary heating element, means for causing said auxiliary contacts to be periodically snapped open and closed in accordance with movement of said bimetallic element, and means for adjusting the position of said second mentioned bracket so that the point at which said contact means are moved from a circuit closing to a circuit opening position in the heating of said bimetallic element and from the circuit opening to the circuit closing position during the cooling of said bimetallic element may be varied to vary the per cent of time said heating circuit is energized during the oscillatory movement of said bimetallic element.

12. An adjustable circuit controller for controlling the wattage output of a heating circuit comprising a support, a bimetallic element having one end fixed to said support and its opposite end free to move, a bracket pivotally mounted on said support and operatively associated with the free end of said bimetallic element so as to be moved about its pivot point in accordance with deflection of said element, a pair of contacts for controlling said heating circuit, means for securing one contact of said pair of contacts to said bracket, a second bracket pivotally mounted on said support, means for securing said other of said pair of contacts to said second bracket, an auxiliary heater element for heating said bimetallic element, auxiliary contacts for controlling the energization of said auxiliary heating element independent of said main heating circuit, resilient means having one end secured to said support and the other end secured to said third mentioned bracket for causing said auxiliary contacts to be periodically snapped open and closed in accordance with the movement of said bimetallic element whereby said bimetallic element is moved to and fro at a substantially constant periodicity which is proportional to the heating and cooling of said element, and means for adjusting the position of said second mentioned bracket so that the per cent of said period that said contacts are in engagement may be varied to vary the per cent of time said heating circuit is energized during said period.

13. A circuit controller for an electrical device having a heating element comprising, a support, a bimetallic element having one end fixed to said support and its opposite end free to move, a bracket pivotally mounted on said support and operatively associated with the free end of said bimetallic element so as to be moved about its pivot point in accordance with deflection of said free end, a pair of contacts for said heater element, one of which is secured to said bracket and the other of which is secured to a second bracket pivotally mounted on said support, an auxiliary heater for heating said bimetallic element, auxiliary contacts for controlling said auxiliary heater, a column spring having one end secured to said support and the other end secured to said first mentioned bracket, said column spring being constructed and arranged to cause said auxiliary contacts to be periodically snapped open and closed in accordance with movement of said bimetallic element so that a switch having a time cycle of operation proportional to the heating and cooling of said bimetallic element is produced, and means for adjusting the position of said second mentioned bracket so that the points in said time cycle at which said main contacts are opened and closed may be varied to vary the per cent of time said heating element is energized during said time cycle.

14. An adjustable circuit controller for controlling the wattage output of a heating circuit comprising a support, a bimetallic element having one end fixed to said support and its opposite end free to move through a predetermined distance upon the heating and cooling of said element, means independent of said heating circuit for intermittently heating said bimetallic element to produce a time cycle of operation proportional to the heating and cooling of said element, control means for controlling said heating circuit, means for periodically operating said control means in accordance with the heating and cooling movement of said bimetallic element so that said heating circuit is periodically energized and deenergized, and means for adjusting said last mentioned means so that the length of time said heating circuit is energized during the heating and cooling cycle of said bimetallic element may be varied.

HEBER L. NEWELL.